A. B. KASPARSON.
MACHINE FOR MAKING HEDDLES.
APPLICATION FILED JAN. 30, 1909.

951,248.

Patented Mar. 8, 1910.
7 SHEETS—SHEET 1.

Witnesses:
M. G. Hennessy
H. C. Bowser

Inventor:
Axel B. Kasparson,
by George A. Rockwell,
Atty.

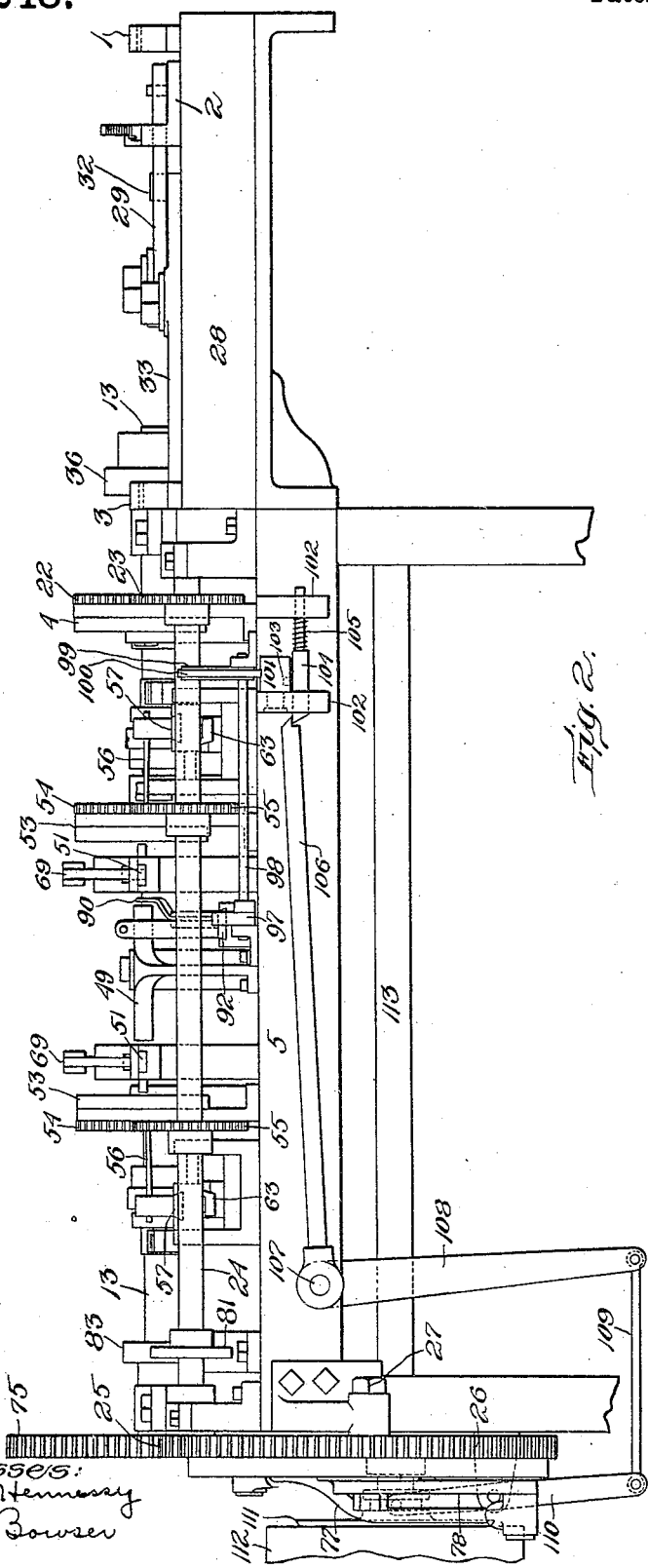

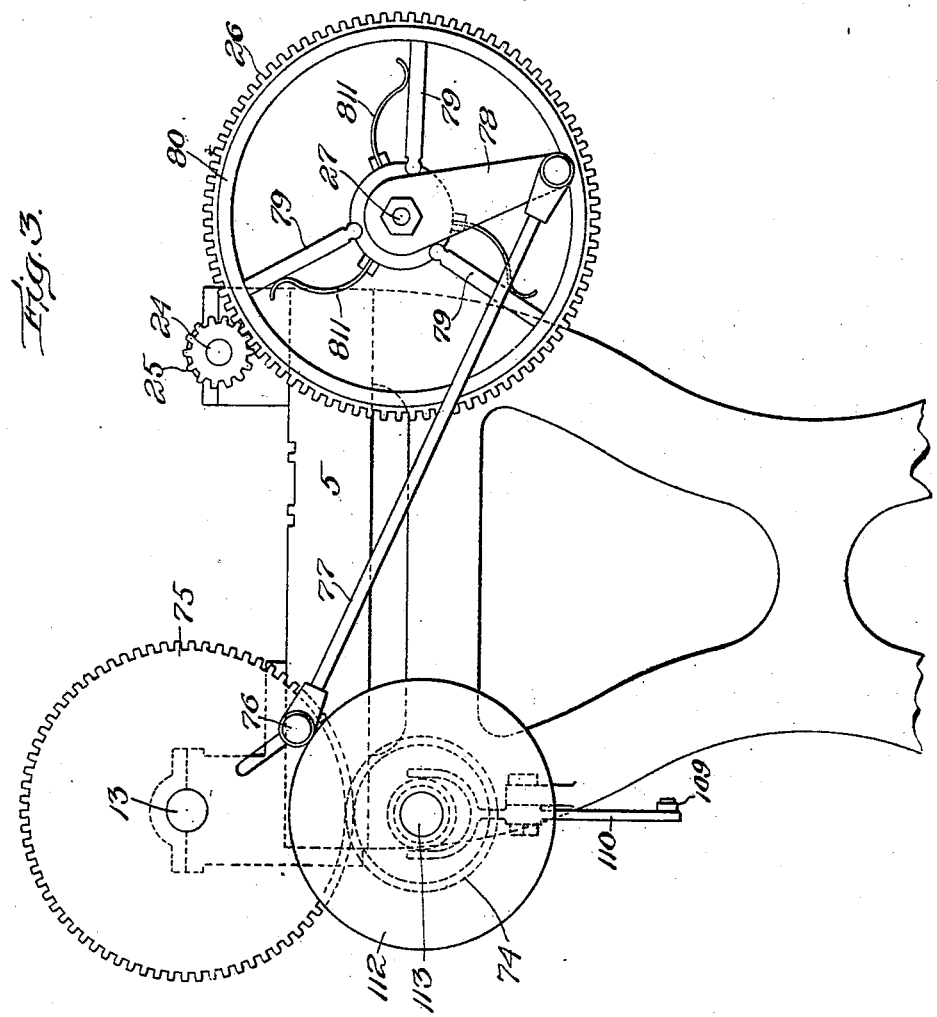

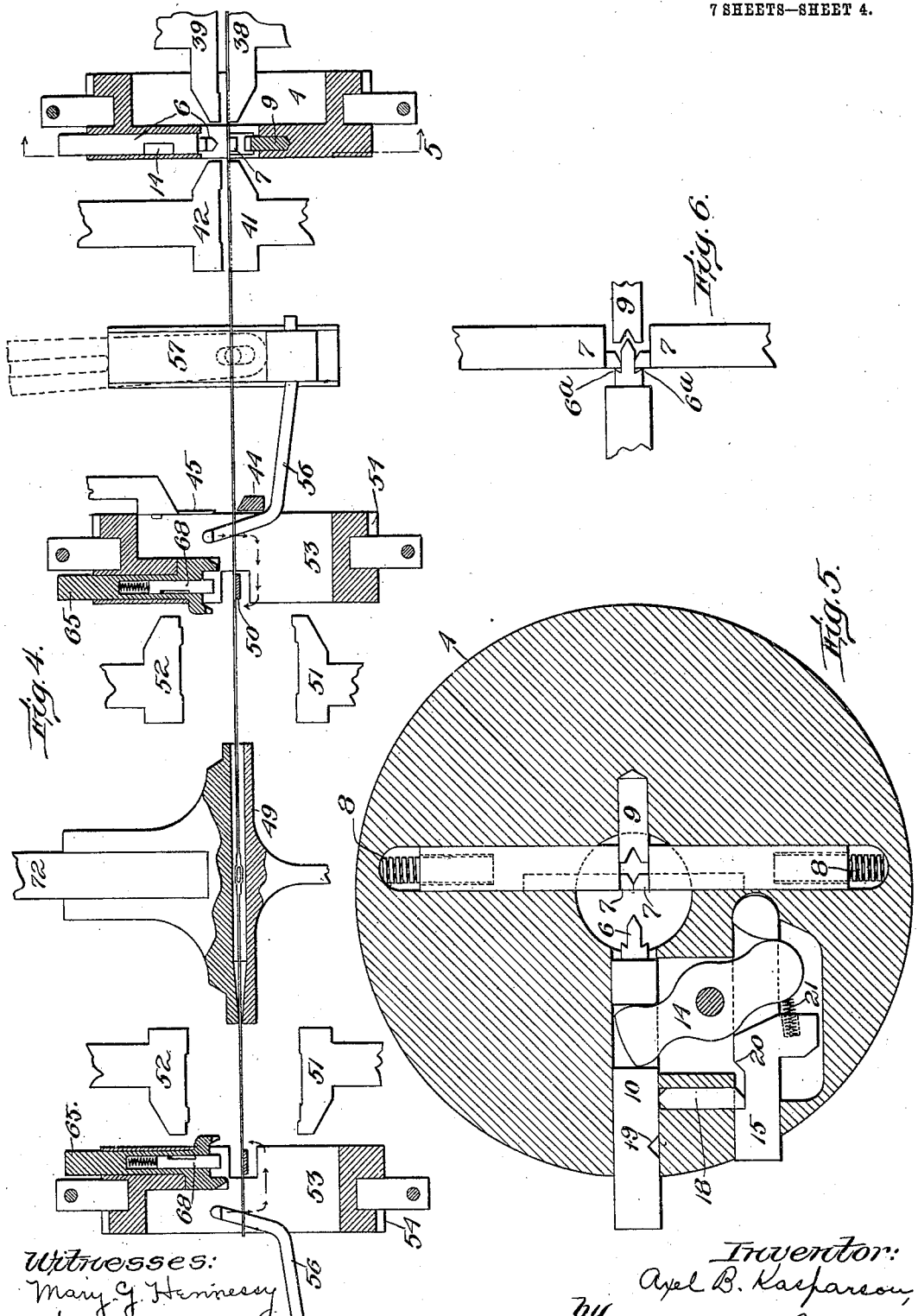

A. B. KASPARSON.
MACHINE FOR MAKING HEDDLES.
APPLICATION FILED JAN. 30, 1909.
951,248.
Patented Mar. 8, 1910.
7 SHEETS—SHEET 5.
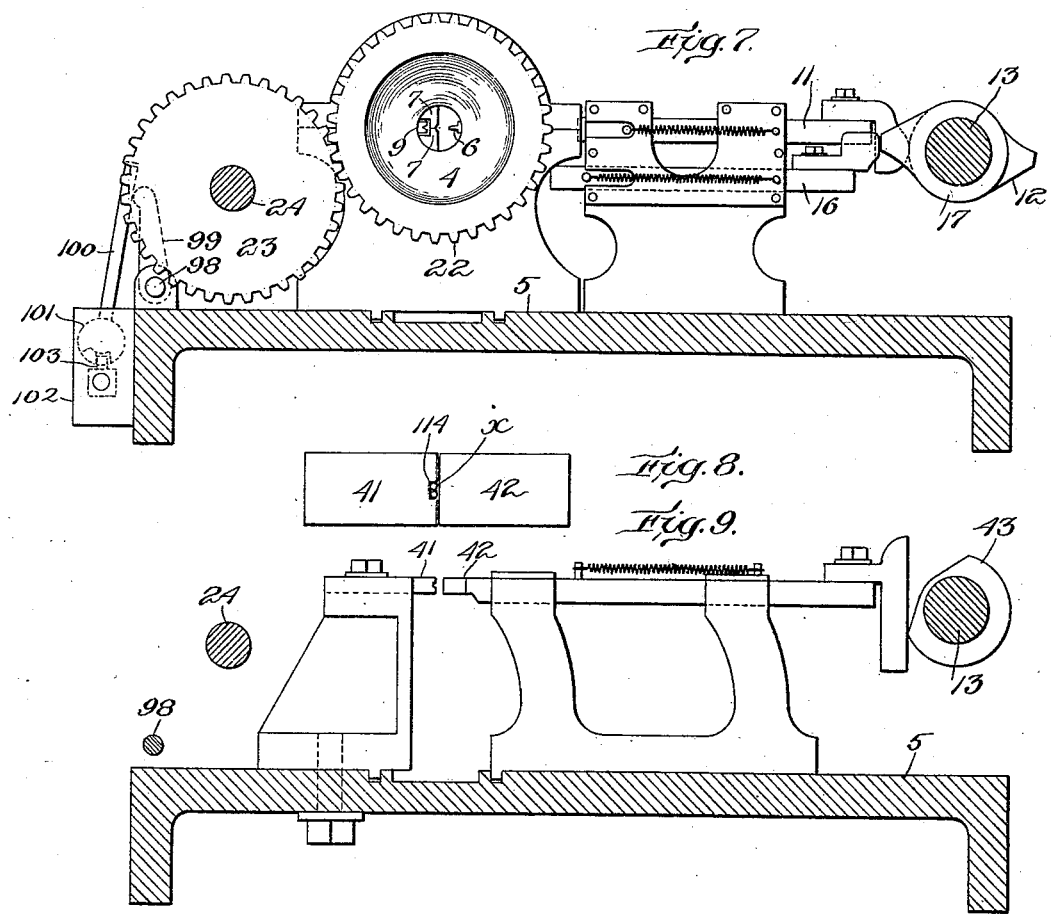
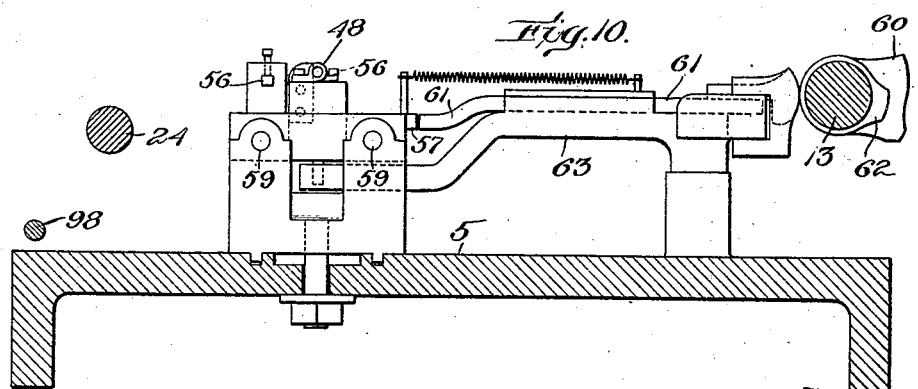

A. B. KASPARSON.
MACHINE FOR MAKING HEDDLES.
APPLICATION FILED JAN. 30, 1909.
951,248.
Patented Mar. 8, 1910.
7 SHEETS—SHEET 6.
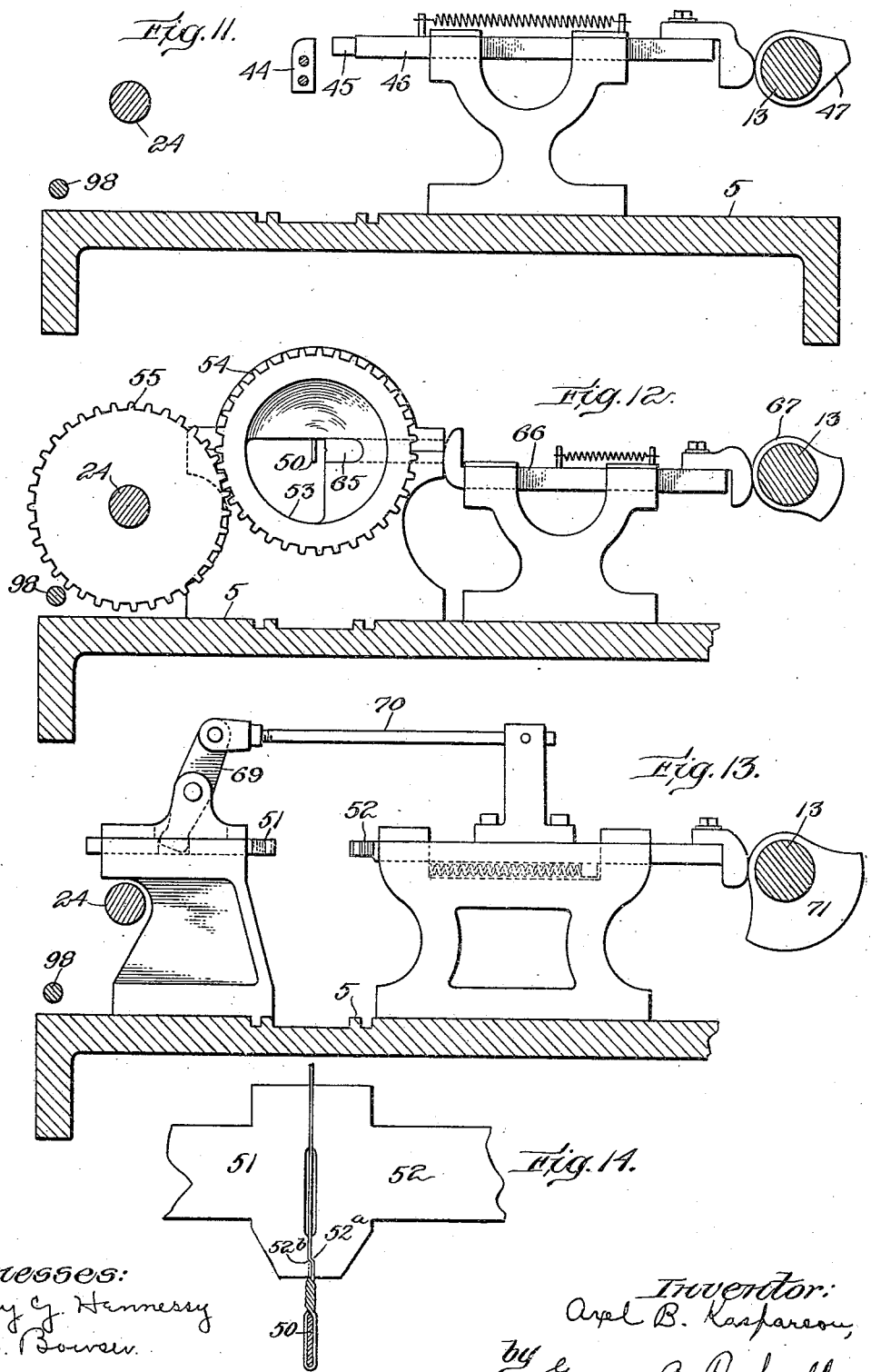
Witnesses:
Mary C. Hennessy
A. C. Bowser
Inventor:
Axel B. Kasparson,
by George A. Rockwell,
Atty.

A. B. KASPARSON.
MACHINE FOR MAKING HEDDLES.
APPLICATION FILED JAN. 30, 1909.

951,248.

Patented Mar. 8, 1910.
7 SHEETS—SHEET 7.

Witnesses:
Mary G. Hennessy
H. C. Bowser

Inventor:
Axel B. Kasparson,
by George A. Rockwell,
Atty.

UNITED STATES PATENT OFFICE.

AXEL B. KASPARSON, OF WORCESTER, MASSACHUSETTS.

MACHINE FOR MAKING HEDDLES.

951,248.     Specification of Letters Patent.     Patented Mar. 8, 1910.

Application filed January 30, 1909. Serial No. 475,124.

*To all whom it may concern:*

Be it known that I, AXEL B. KASPARSON, of Worcester, in the county of Worcester and State of Massachusetts, have invented a new and useful Machine for Making Heddles, of which the following is a specification.

The main objects of my invention are to provide a machine which will be efficient and economical in operation and whose product will be more perfect and uniform than the product of heddle machines heretofore known.

My invention consists in the general organization of the machine hereinafter described and claimed and especially in the mechanism for forming the center eye, the mechanism for forming the end loops, the feed mechanism, and the stop motion mechanism.

Figure 1:
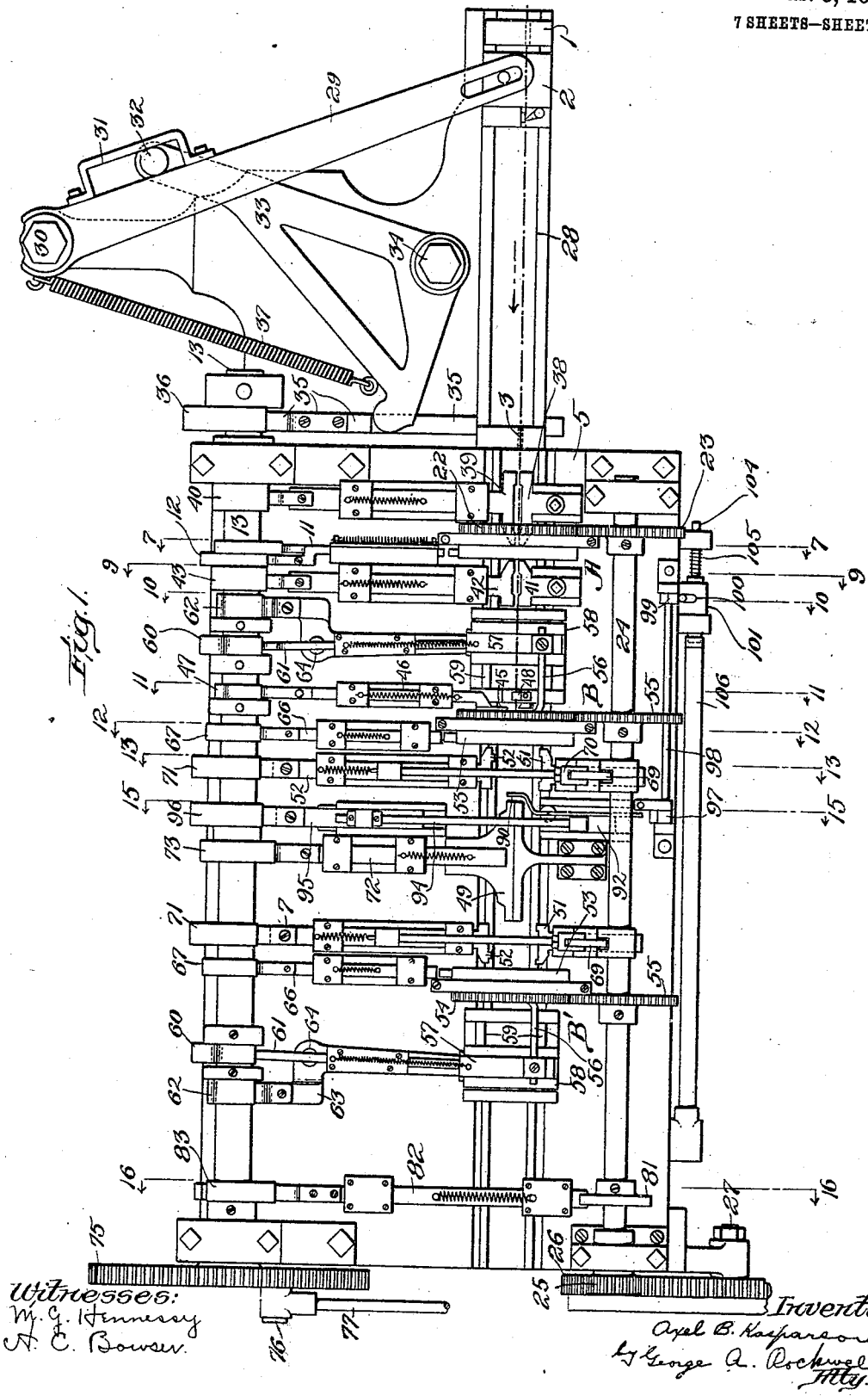
Figure 15:
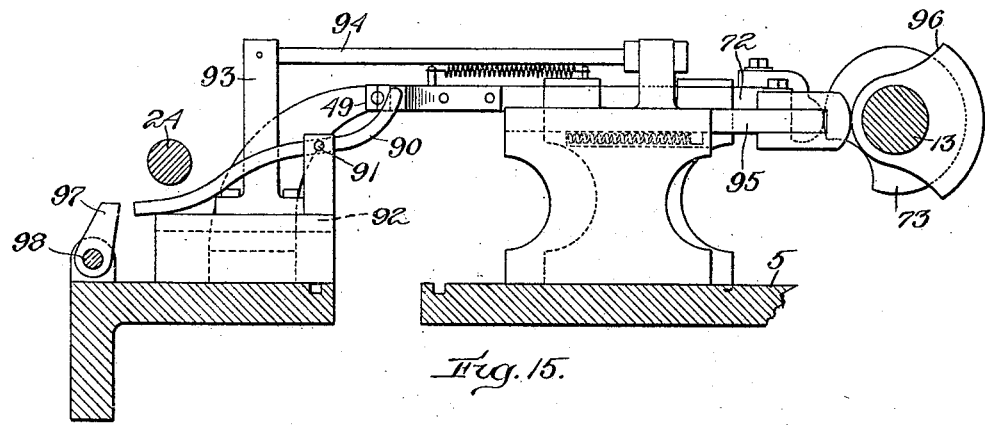
Figure 16:
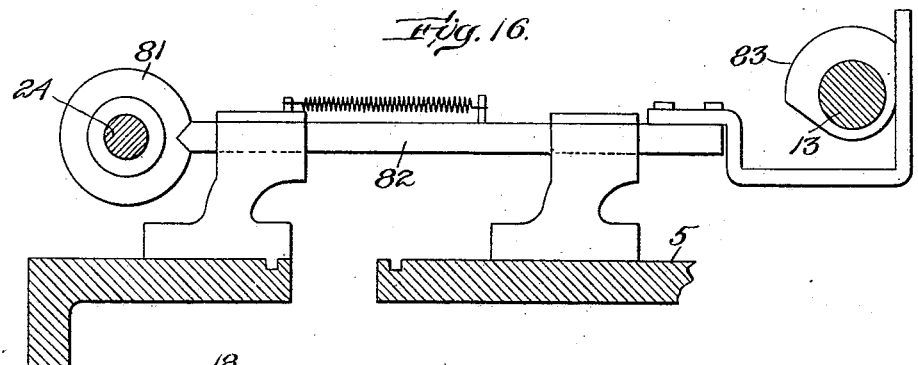
Figure 17:
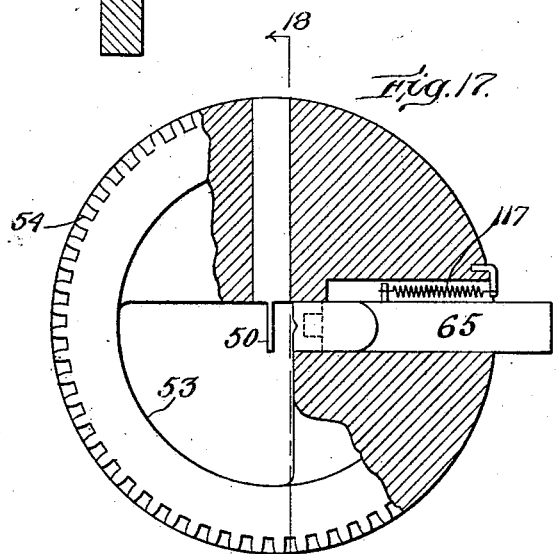
Figure 18:
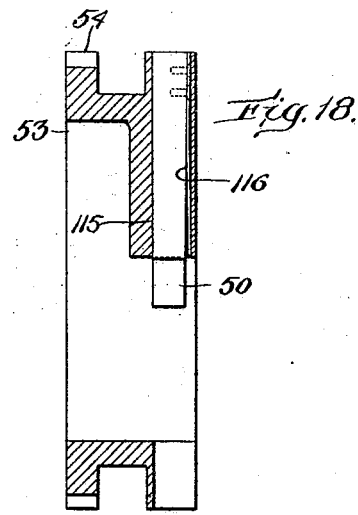

In the drawings Figure 1 is a plan view of a machine embodying my invention; Fig. 2 is a front elevation of that machine; Fig. 3 is an elevation of the left hand end of the machine shown in Fig. 1; Fig. 4 is a diagrammatic view of the several heddle forming elements; Fig. 5 is a vertical section on line 5—5 of Fig. 4 on a larger scale; Fig. 6 is a detail of the punch in its closed position; Figs. 7 and 9 to 13 inclusive are sections on the correspondingly numbered section indicating lines of Fig. 1; Fig. 8 is a detail of the jaws for holding the wire against rotation while the punch is rotating; and Fig. 14 is a detail of the jaws for holding the wire while the end loops are being rotated; Figs. 15 and 16 are sections on lines 15—15 and 16—16 of Fig. 1. Fig. 17 is a side view partly broken away of one of the carriers hereinafter described. Fig. 18 is a section on line 18—18 of Fig. 17.

I will describe my machine as acting upon double soldered wire but any other suitable material may be used.

The double soldered wire from which the heddles are made is led from a suitable reel, not shown, through a perforated guide block 1 fixed to the frame of the machine, past a feed slide 2 of ordinary construction, through a second perforated guide block 3 fixed to the frame of the machine, and thence first to the devices which form the middle eye of the heddle, and then to the devices which sever the heddle thus partly formed from the supply, and complete the same by producing the loops at the ends of the severed section.

The middle-eye forming mechanism is located at A in Fig. 1, and the punch thereof is shown in detail in Figs. 5 and 6. This punch consists of a rotatable carrier 4 journaled in a bearing on a table 5, the latter forming part of the frame of the machine. The eye-forming punch 6 is mounted to slide radially in the carrier 4, toward and from a pair of spring-pressed anvil blocks 7, which are normally held by their springs 8 against an intermediate positioning stop 9 so that the joint between these two blocks is directly in the path of the punch, and when the latter is thrown forward to penetrate the wire it will pass through the double soldered wire and between the anvil blocks 7 against which the wire will be held by the shoulders 6$^a$ of the punch 6, while the carrier 4 is rotated to produce the twists at each side of the eye being formed. The outer end of punch 6 projects from the carrier 4 to coöperate with a slide 11 mounted in ways on the frame of the machine and operated by a cam 12 on the cam shaft 13. Pivoted within a chamber formed in carrier 4 alongside punch 6 is a lever 14 connecting punch 6 with a slide 15 mounted in the carrier 4. Slide 15 projects from carrier 4 to coöperate with a slide 16 mounted in ways on the frame of the machine and operated by a cam 17 on the cam shaft 13. Between punch 6 and slide 15 is a bolt 18 slidably mounted in the carrier 4, said bolt at one end coöperating with a socket 19 provided in punch 6, and at its other end with a cam surface 20 upon the slide 15. When the slide 11 is operated to shove the punch inwardly through the double soldered wire, the lever 14 shifts slide 15 outwardly, and as the punch reaches its innermost position the cam surface 20 forces the bolt 18 into the socket 19 thereby locking punch 6 in its innermost position. Punch 6 is moved outwardly to withdraw it from the eye that has been formed in the double soldered wire, through the engagement of slide 16 with the slide 15 which occurs after carrier 4 has been rotated to make the twists at each side of the middle eye and while the carrier is at rest. The inward movement of slide 15 acts through the lever 14 to shift punch 6 outwardly. In order to provide for limited relative movement between lever 14 and slide 15 at the start of the inward movement of the latter, a spring 21 is interposed between those parts, thereby permitting the cam surface 20 to move out of engagement with the bolt 18 at the start of the inward movement of slide 15, after which the lost motion is taken up and the lever 14 moves with slide 15 and shifts punch 6 outwardly.

The carrier 4 is made with a gear 22 that is driven by a gear 23 fixed to a shaft 24. At one end shaft 24 carries a pinion 25, intermittently driven by a gear 26 loosely mounted on a stud 27 projecting from the frame of the machine.

The feed slide 2 is shifted back and forth along ways 28 by a lever 29 pivoted at 30. Lever 29 is made with a slot 31 into which projects a stud 32 carried by a second lever 33 pivoted at 34 to the frame of the machine. Lever 33 is swung in one direction by a slide 35 operated by a cam 36 on shaft 13, and in the other direction by a spring 37.

At one side of the punch 6 is a fixed jaw 38 coöperating with a movable jaw 39 mounted in ways on the frame of the machine, and operated by a cam 40 on the shaft 13. At the opposite side of the punch 6 is a fixed jaw 41 coöperating with a movable jaw 42 mounted in ways on the frame of the machine and operated by a cam 43 on shaft 13. When the lever 29 shifts the feed slide 2 to the left in Fig. 1 and feeds the wire forward, the jaws 38 and 39, 41 and 42 are open, but at the completion of the feeding movement of the slide 2 these jaws close onto the wire and hold the latter against rotating while the carrier 4 is rotated as above described. The jaws 38 and 41 are made with longitudinal grooves 114 which are rectangular, said grooves being of a width to accommodate the double soldered wire, as shown at $x$, Fig. 8, and of such a depth that when the jaw 42 or 39 occupies its closed position against the jaw 41 or 38, the double soldered wire is confined within the grooves 114, so that it can not rotate with punch 6, but is free to move lengthwise in the grooves as the operation of twisting the middle eye progresses. The slide 11 is operated to drive the punch 6 inwardly through the wire where it is held by the bolt 18, just before the carrier 4 is rotated to twist the double soldered wire together at each side of the eye formed by the punch 6.

At a suitable distance to the left of the punch 6, determined by the length of the heddle being made, there is provided a fixed cutter 44 coöperating with a movable cutter 45 carried by a slide 46 mounted in ways on the table 5 and operated by a cam 47 on the shaft 13. Each feeding movement of the slide 2 carries the section of the wire which has had a center eye formed in it past the cutters 44 and 45 which sever said section from the supply immediately upon the completion of that feeding movement. The severed section of wire is then operated upon by the mechanism which forms the end loops, while a middle eye is being formed in the next section of the wire that is to be severed. A guide eye 48 is provided alongside of the cutters 44 and 45 which supports the advance end of the wire and at the beginning of the feed stroke of the slide 2 this advance end of the wire is carried through end-loop forming mechanism located at B and B', it being supported and guided by a two-part tube 49 as it passes from B to B' into the position shown in Fig. 4. After the cutters 44 and 45 sever the advance section of wire from the supply, the ends of this section are bent around formers 50 and then gripped by the jaws 51 and 52 while the formers 50 are rotated to twist the bent-back ends and the body together. Each former 50 is mounted upon a rotatable carrier 53 journaled on the frame of the machine and provided with a gear 54 that is driven by gear 55 on the shaft 24 in unison with the carrier 4.

Each former 50 is mounted within a chamber 115 provided in its carrier so that its inner end has provision for limited lateral movement, the lower end of the former being normally held at one side of the chamber 115 by a spring 116, as shown in Fig. 18. In the operation of the end-loop forming mechanism the ends of the wire blank are bent around the formers 50, then the jaws 51 and 52 grip the bent back ends and the body of the heddle blank while the carriers 54 are rotated. This twists the body of the heddle blank and the bent back ends together at points between the jaws 51 and 52 and the formers, and during the formation of these twists the formers 50 yield laterally opposed by the springs 116 to compensate for the slight shortening of the heddle resulting from the twisting operation.

Alongside of each carrier 53 is an end bender 56 mounted upon a carriage 57 the latter being mounted upon a second carriage 58 so as to slide crosswise of the direction of feed, while the carriage 58 is mounted upon guide rods 59 so as to slide parallel with the direction of feed. The carriage 57 is shifted on the carriage 58 by a cam 60 acting through an intermediate slide 61 mounted on a lever 63, while the carriage 58 is operated by a cam 62 acting through the lever 63, the latter being pivoted at 64 upon the top of table 5.

Normally the end benders 56 occupy the positions shown in Fig. 4, but at the completion of the feeding movement of slide 2 and after cutter 45 has been operated to sever the advance section of the wire, cams 60 and 62 act through the connections just described to shift the wire engaging ends of the end benders 56 along the paths indicated by the arrows in Fig. 4, from their normal positions partly around the formers 50, and then back again to their normal positions. As the end benders 56 start from their normal positions they engage the ends of the severed section and fold the same around the formers 50 back upon the body portion of the heddle being made, and hold said ends there until the jaws 51 and 52 are closed onto the bent back ends and the body of the heddle that is being formed. Each carrier 53 has slidably mounted in it a primary end bender 65 whose outer end projects from the carrier 53 to coöperate with a slide 66 operated by a cam 67 on the shaft 13, the end bender 65 being operated in one direction by the cam 67 acting through slide 66, while carrier 54 is at rest, and in the opposite direction by the spring 117. The inner end of the primary end bender 65 is formed to partly embrace its former and forked or notched so as to straddle and thereby hold the material against movement on the former. Cams 67 are timed to shift the primary end benders 65 inwardly against the formers 50 at about the same time that the secondary end benders 56 start to carry the ends of the wire around the formers. Within each primary end bender 65 is mounted a spring pressed plunger 68 which yieldingly engages the side of the loop being formed and prevents its spreading or bowing as the end is bent around the former Each of the jaws 51 (see Fig. 13) is movably mounted in ways on the frame of the machine and connected through a lever 69 and link 70 with its coöperating jaw 52, which is also movably mounted in ways on the frame of the machine. Each jaw 52 is operated by a cam 71 on the shaft 13, and, as will be clear, when the jaws 52 are shoved toward the wire by the cams 71 the levers 69 act to shove the jaws 51 toward the wire also.

The tube 49 is made in two parts, one part being fixed to the frame of the machine, and the other part being carried by a slide 72 operated by cam 73 on shaft 13. During the feed movement of slide 2 and during the operation of forming the end loops on the advance or severed section of the wire, the tube 49 is held closed, but when the end loops are completed the tube 49 is momentarily opened by the cam 73, thus allowing the completed heddle to drop off of the ends of former 50 out of the machine, the tube acting as a guide and as a support.

The shaft 13 is continuously driven by a gear 74 meshing with a gear 75 fixed on said shaft 13. The gear 75 carries a crank pin 76 connected by a rod 77 with a lever 78 loosely mounted on the stud 27 alongside of the gear 26. The hub of lever 78 is made with sockets within which rest the inner ends of toggle members 79, the outer ends of toggle members 79 being pressed against the interior of an annular flange 80, provided on the outer face of gear 26, by springs 811 carried by the hub of lever 78. The toggle members 79 are slightly longer than the distance between the hub of lever 78 and the annular flange 80, so that they occupy a slightly tangential relation to the stud 27 with the result that when lever 78 is swung to the left in Fig. 3 the toggle members 79 slide idly within the annular flange 80, but when lever 78 swings in the opposite direction toggle members 79 clutch the flange 80 and cause the gear 26 to rotate with the lever 78. It will thus be seen that while the shaft 13 is continuously driven the shaft 24 is intermittently operated, the relative size of the gears 26 and 25, herein shown, being such that the shaft is given two revolutions for each revolution of the shaft 13.

In order to positively position the eye-forming punch 6 and the end-loop formers 50 while they are at rest, and to lock these parts in proper position at such time, the shaft 24 has fixed to it a notched disk 81 coöperating with a bolt 82 mounted in ways on the table 5 and operated by cam 83 on the shaft 13. Cam 83 is timed so that bolt 82 is disengaged from disk 81 just as lever 78 starts to swing to the right in Fig. 3, and reëngaged with said disk just as said lever 78 completes its movement to the right. The notch of the disk 81 is V-shaped as shown in Fig. 17, and the end of belt 82 which engages said notch is correspondingly shaped so that if the movement imparted to shaft 24 should vary slightly either in one direction or the other, the engagement of bolt 82 with the notch 81 will position the shaft 24, and will also lock all parts connected with said shaft in their proper positions while at rest.

In order to automatically stop the operation of the machine in the event of the exhaustion of the wire from which the heddles are made, I have herein provided a feeler 90 pivoted at 91 to a post projecting from a slide 92 mounted in ways on the frame of the machine. The slide 92 is connected by a post 93 and a rod 94 with a slide 95 mounted in ways on the frame of the machine, the slide 95 being operated by a cam 96 on the shaft 13, so as to shift the upper end of the feeler 90 back and forth across the line of feed. The lower end of the feeler 90 coöperates with an arm 97 fixed to a rock shaft 98 journaled in bearings on the frame of the machine. The rock shaft 98 also carries an arm 99 coöperating with an arm 100, projecting from a cam 101 rotatably mounted on a bracket 102 projecting from the frame of the machine. The cam 101 is made on its under side with a cam slot into which extends a pin 103 projecting from a bolt 104. A spring 105 normally holds bolt 104 at the limit of its movement to the left in Fig. 2 with the arm 100 against the arm 99. Bolt 104 coöperates with an arm 106 fast to a shaft 107, which latter also carries an arm 108 connected by a link 109 with a lever 110 connected at its upper end with the movable member 111 of a clutch, the other member of the clutch being a driving pulley 112 loosely mounted on a shaft 113. The shaft 113 has fixed to it the pinion 74, above referred to, that drives the gear 75. The arm 106 is, while the machine is running, held in the position shown in Fig. 2 by the bolt 104.

Each time the slide 92 is moved forward to the left in Fig. 15, and the upper end of the feeler 90 strikes the wire that has been fed forward, the lower front end of the feeler 90 is lifted so as to pass over the upper end of the arm 97. If, however, the wire is absent from the path of the feeler 90, then the front end of the latter will not be lifted, but will engage the arm 97 and rock shaft 98, thereby causing the arm 99 acting through the arm 100 to operate cam 101 and retract the bolt 104, and free the arm 106, thus allowing the latter to fall. The dropping of the arm 106 relieves the pressure on the clutch member 111 and causes the machine to stop. The cam 96 is timed so as to shift feeler 90 to the left in Fig. 15, while the feed slide 2 is making its feeding stroke, and at a time when the advance end of the wire should have passed the feeler 90, and to hold the feeler 90 at the limit of its movement to the left in Fig. 15 until after the tube 49 has been opened to discharge the heddle from the machine. That is, the feeler 90 is not moved back into the position shown in Fig. 15 until after the heddle has been discharged from the machine.

As will be seen in Fig. 6 the punch 6 is made with a pair of undercut shoulders 6ᵃ which pocket the two strands of the wire separated by the punch to form the middle eye, and so hold these strands as to prevent distortion of the eye while the twists are being made at each side of the latter. In other words, these undercut shoulders 6ᵃ assist in forming the middle eye while it is being made.

The operation of the machine will be clear from this description.

What I claim is:

1. A machine for making heddles, comprising end-loop forming mechanism, center-eye forming mechanism; means to feed the wire to one of said mechanisms and after that mechanism has operated to feed it to the other mechanism; and means to sever the heddle blank from the supply.

2. In a machine of the character described, in combination, means for forming end loops at the ends of the heddle blank; and automatic means to make heddle blanks, each having a center eye and twists at each end of said eye, and to intermittently feed the blanks after they have been so formed to said loop-forming means.

3. A machine for making heddles, comprising intermittently acting feed mechanism; end-loop forming devices; means between said feed mechanism and said loop-forming devices for severing a blank from the supply; and automatic means between the severing means and the feed mechanism for forming eyes in the wire before it is fed to the loop-forming and severing devices and while the wire is at rest.

4. In a heddle machine, the combination of a punch; a carrier upon which the punch is mounted to reciprocate; means to reciprocate the punch; and a positively operated bolt to lock the punch in its closed position.

5. In a heddle machine, the combination of a punch; means to move the punch into operative position; means actuated by the punch when the latter is moved into operative position for locking the punch in that position.

6. In a heddle machine, the combination of a punch; means to move the punch into operative position; means actuated by the punch when the latter is moved into operative position for locking the punch in that position; and means for operating said locking means to unlock and retract the punch.

7. In a heddle machine, the combination of a carrier; a slide mounted on the carrier and carrying a punch; a second slide mounted on the carrier; and a lever pivotally mounted on the carrier, one of whose ends engages one slide and the other end the other slide, substantially as and for the purposes described.

8. In a machine of the character described, the combination of an anvil; and a punch coöperating therewith having under-cut shoulders coöperating with the anvil to pocket the material at each side of the punch.

9. In a machine of the character described, the combination of an anvil comprising two spring-pressed jaws; a punch coöperating with said jaws; means for operating the punch to move it in and out between the yielding jaws of the anvil, said punch being made with under-cut shoulders coöperating with the anvil jaws to pocket the material.

10. In a machine of the character described, the combination of a rotatable carrier; a pair of yielding pressed anvil jaws mounted on the carrier; a punch coöperating with said jaws and slidably mounted on said carrier; a lever pivotally mounted on said carrier and coöperating at one end with said punch; a slide mounted on said carrier and coöperating with the other end of the said lever; and a locking bolt for the punch mounted on the carrier and controlled by said slide.

11. In a machine of the character described, the combination of a punch; means at each side of the punch to hold the material at these points against rotary movement but with provision for free longitudinal movement relatively to said holding means while the latter is holding the material; and means to produce relative rotary movement between said punch and said holding means.

12. In a machine of the character described, the combination of a punch; means at each side of the punch to hold the material at those points but with provision for free longitudinal movement relatively to said holding means while the latter is holding the material; and means to produce relative rotary movement between said punch and said holding means.

13. In a heddle machine, the combination of a punch; a bearing upon which the punch is mounted to move; means for automatically locking the punch in its projected position; means for moving the punch into retracted position; and means operated by the latter means for automatically unlocking the punch when said punch retracting means is operated.

14. In a machine of the character described, the combination of a rotatable punch; means for intermittently operating it; means to feed the material; means at one side of the punch for holding the material against rotating but with provision for free longitudinal movement; a pair of jaws at the opposite side of the punch for holding the material against rotating but with provision for free longitudinal movement; and means to operate said jaws so as to hold them closed while the punch is being rotated and to open said jaws while the material is being fed.

15. In a machine of the character described, the combination of an end-loop former; bending means comprising a carriage movable longitudinally of the heddle blank, means to reciprocate the said carriage, an end bender mounted upon said carriage with provision for movement thereon crosswise of the heddle blank, and means for shifting said end bender on said carriage crosswise of the heddle blank.

16. In a machine of the character described, the combination of an end-loop former; bending means comprising a carriage movable longitudinally of the heddle blank, means to reciprocate said carriage, a slide mounted on said carriage with provision for movement crosswise of the heddle blank, means for operating said slide, and an end bender mounted on said slide and coöperating with the loop former.

17. In a machine of the character described, the combination of end-loop forming mechanism comprising a rotatable carrier; means for intermittently operating said carrier; a pair of jaws for engaging the material; means for operating said jaws; end-bending devices; and a loop former coöperating with the end-bending devices, said loop former being mounted on the carrier so as to yield laterally during the twisting operation.

18. In a machine of the character described, the combination with two end-loop forming devices and material-feeding means, of a two-part guiding tube for the material, said tube being arranged between the two end-loop forming devices; and means to open said tube to discharge the heddle and to close said tube while the material is being fed.

19. In a heddle machine, the combination of a punch; a carrier in which the punch is mounted to reciprocate; means to rotate said carrier intermittently; and means to automatically adjust said carrier during its periods of rest to properly position the punch.

20. In a heddle machine, the combination of a punch; a carrier in which the punch is mounted to reciprocate; means to rotate said carrier intermittently; and means to automatically adjust and hold said carrier during its periods of rest to properly position the punch.

21. In a machine of the character described, in combination, center-eye forming devices; end-loop forming devices; an actuating shaft connected with said devices; means to intermittently operate said shaft; and means to adjust said shaft while it is at rest to position the parts driven thereby.

22. In a machine of the character described, in combination, center-eye forming devices; end-loop forming devices; an actuating shaft connected with said devices; means to intermittently operate said shaft; and means to adjust and lock said shaft while it is at rest to position the parts driven thereby.

23. In a machine of the character described, the combination of loop-forming mechanism comprising a former; an end-bender coöperating with the former; and a yielding presser carried by the end-bender for holding the side of the loop against the former.

24. In a machine of the character described, the combination with intermittent blank feeding mechanism; of heddle-forming mechanism; and an automatic stop motion controlled by the intermittently fed blanks.

25. In a machine of the character described, the combination of heddle-forming mechanism; means to feed the material to said mechanism; a feeler; means to shift the feeler back and forth across the line of feed; and means adapted to be actuated by said feeler to stop the machine upon failure of the feed.

AXEL B. KASPARSON.

Witnesses:
JAMES C. DONNELLY,
WEBSTER THAYER.